US008709213B2

(12) United States Patent  
Compton et al.

(10) Patent No.: US 8,709,213 B2  
(45) Date of Patent: Apr. 29, 2014

(54) COMPOSITE GRAPHENE OXIDE-POLYMER LAMINATE AND METHOD (75) Inventors: Owen C. Compton, Chicago, IL (US); Karl W. Putz, Chicago, IL (US); L. Catherine Brinson, Evanston, IL (US); SonBinh T. Nguyen, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 12/931,407

(22) Filed: Jan. 31, 2011

(65) Prior Publication Data

US 2011/0256376 A1     Oct. 20, 2011

Related U.S. Application Data (63) Continuation-in-part of application No. 12/152,283, filed on May 13, 2008.

(60) Provisional application No. 60/930,101, filed on May 14, 2007.

(51) Int. Cl.
```
B32B 5/00      (2006.01)
D21H 13/46     (2006.01)
D21H 13/36     (2006.01)
B32B 19/00     (2006.01)
D21H 15/00     (2006.01)
D21F 13/00     (2006.01)
```
(52) U.S. Cl.
CPC .............. *D21H 13/46* (2013.01); *D21H 13/36* (2013.01); *D21H 5/008* (2013.01); *D21F 13/00* (2013.01); *B32B 19/00* (2013.01)
USPC ............... 162/348; 264/87; 264/86; 428/420; 428/411.1

(58) Field of Classification Search
CPC .......... B32B 9/04; B32B 17/06; B32B 9/047; B32B 19/00; D21F 13/00; D21H 5/008; D21H 13/36; D21H 13/46
USPC ....................................... 264/86, 87; 162/348
See application file for complete search history.

(56) References Cited

U.S. PATENT DOCUMENTS

| | | | |
|---|---|---|---|
| 3,149,023 A * | 9/1964 | Bodendorf et al. | 162/135 |
| 2002/0159943 A1 | 10/2002 | Smalley et al. | 423/447.1 |
| 2003/0224168 A1 | 12/2003 | Mack et al. | 428/408 |
| 2006/0030483 A1 | 2/2006 | Jang | 502/400 |
| 2006/0102562 A1 | 5/2006 | Cannon et al. | 210/681 |
| 2006/0144543 A1 * | 7/2006 | Aho et al. | 162/164.6 |

(Continued)

OTHER PUBLICATIONS

Noorden, Moving towards a pgraphene world, Nature, vol. 442/20 Jul. 2006.*

(Continued)

*Primary Examiner* — Jacob Thomas Minskey
(74) *Attorney, Agent, or Firm* — Klintworth & Rozenblat IP LLC (57) ABSTRACT

A macroscale, self-supporting, composite laminate sheet includes individual, layered graphene oxide sheets and a polymer in spaces between the sheets. This composite product can be fabricated by combining a suspension of individual graphene oxide sheets and a solution of polymer, passing the resulting fluid through a fluid-permeable support, and assembling the graphene oxide sheets and polymer as a laminate sheet by flow-directed assembly. The laminate is dried and released from the membrane filter as a self-supporting thin films.

15 Claims, 8 Drawing Sheets

(56) References Cited

U.S. PATENT DOCUMENTS

| | | | | |
|---|---|---|---|---|
| 2006/0202105 | A1 | 9/2006 | Krames et al. | 250/208.1 |
| 2007/0092432 | A1* | 4/2007 | Prud'Homme et al. | 423/448 |
| 2007/0131915 | A1* | 6/2007 | Stankovich et al. | 252/511 |
| 2010/0035093 | A1* | 2/2010 | Ruoff et al. | 429/12 |
| 2010/0144904 | A1* | 6/2010 | Wang et al. | 516/98 |

OTHER PUBLICATIONS

Dmitriy A. Dikin, et al., Preparation and characterization of graphene oxide paper, Nature, Jul. 2007, vol. 448, pp. 457-460.

Jonathan N. Coleman, et al., Improving the mechanical properties of single-walled carbon nanotube sheets by intercalation of polymeric adhesives, Applied Physics Letters, Mar. 2003, vol. 82, No. 11, pp. 1682-1684.

M.B. Dowell and R.A. Howard, Tensile and Compressive Properties of Flexible Graphite Foils, Carbon, 1986, vol. 24, No. 3, pp. 311-323.

Yang Leng, et al., Influences on Density and Flake Size on the Mechanical Properties of Flexible Graphite, Carbon, 1998, vol. 36, No. 7-8, pp. 875-881.

R.A. Reynolds III, et al., Influence of expansion volume of intercalculated graphite on tensile properties of flexible graphite, Carbon, 2001, vol. 39, pp. 473-481.

G.I. Titelman, et al., Characteristics and microstructure of aqueous colloidal dispersions of graphite oxide, Carbon, 2005, vol. 43, pp. 641-649.

Sasha Stankovich, et al., Synthesis of graphene-based nanosheets via chemical reduction of exfoliated graphite oxide, Carbon, 2007, vol. 45, pp. 1558-1565.

L. Berhan, et al., Mechanical properties of nanotube sheets: Alterations in joint morphology and achievable moduli in manufactured materials, Journal of Applied Physics, 2004, vol. 95, No. 8, pp. 4335-4345.

D.G.H. Ballard, et al., Flexible inorganic films and coatings, Journal of Materials Science, 1982, vol. 18, pp. 545-561.

Sasha Stankovich, et al., Stable aqueous dispersions of graphitic nanoplatelets via the reduction of exfoliated graphite oxide in the presence of poly(soldium 4-styrenesulfonate), Journal of Materials Chemistry, 2006, vol. 16, pp. 155-158.

D.E. Soule, et al., Direct Basal-Plane Shear in Single-Crystal Graphite, Journal of Applied Physics, 1968, vol. 39, pp. 5122-5139.

Xiefei Zhang, et al., Properties and Structure of Nitric Acid Oxidized Single Wall Carbon Nanotubes Films, Journal of Physical Chemistry B, 2004, vol. 108, pp. 16435-16440.

William S. Hummers, Jr., et al., Preparation of Graphitic Oxide, Journal of the American Chemical Society, 1958, p. 1339.

Zhiyong Tang, et al., Nanostructured artificial nacre, Nature Materials, 2003, vol. 2, pp. 413-418.

Sasha Stankovich, et al., Graphene-based composite materials, Nature, 2006, vol. 442, pp. 282-286.

Frank Hennrich, et al., Preparation, charcterization and applications of free-standing single walled carbon nanotube thin fils, Phys. Chem. Chem. Phys., 2002, 4, pp. 2273-2277.

A. Lerf, et al., Hydrations behavior and dynamics of water molecules in graphite oxide, Journal of Physics and Chemistry of Solids, 2006, vol. 67, pp. 1106-1110.

Mikko Alava, et al., The Physics of Paper, Reports on Progress in Physics, 2006, 69, pp. 669-723.

R.H. Baughman, et al., Carbon Nanotube Actuators, Science 284, 1999, pp. 1340-1344.

J.D. Hartgerink, et al., Self-Assembly and Mineralization of Peptide-Amphiphile Nanofibers, Science, vol. 294, 2001.

N.I. Kovtyukhova, et al., Layer-by-Layer Assmebly of Ultrathin Composite Films from Micron-Sized Graphite Oxide Sheets and Polycations, Chem.Mater., 1999, 11, pp. 771-778.

Jie Liu, et al., Fullerene Pipes, Science, 1998, 280, pp. 1253-1256.

Von W. Scholz, et al., Betrachtungen zur Struktur des Graphitoxids, Zeitschrift fuer Anorganische and Allemeine Chemie, 1969, 369(3-6), 327-340.

* cited by examiner

COMPOSITE GRAPHENE OXIDE-POLYMER LAMINATE AND METHOD

RELATED APPLICATIONS

This application is a continuation-in-part of Ser. No. 12/152,283 filed May 13, 2008, which claims priority and benefits of U.S. provisional application Ser. No. 60/930,101 filed May 14, 2007, the disclosures of both of which are incorporated herein by reference.

CONTRACTUAL ORIGIN OF THE INVENTION

The invention was made with government support under Grant No. DMR-0520513, CHE-0936924, and NIRT-0404291 awarded by the National Science Foundation. The government has certain rights in the invention.

FIELD OF THE INVENTION

The present invention relates to a macroscale composite laminate comprising individual layered graphene oxide sheets and a polymer vacuum-assisted self-assembled so as to form a sheet laminate product such as a film or paper.

BACKGROUND OF THE INVENTION

Composites are important engineering materials that combine the properties of multiple components to afford materials with new properties that are not attainable in the individual components. The use of nanoscale components, or nanofillers, in composite structures has been shown to significantly affect mechanical, dynamic, optical, fire resistance, and electrical and thermal conduction properties. To optimize the properties of composite materials, control over their structure (location and orientation of filler materials) is important. Many current techniques for the production of nanocomposite materials result in isotropically random materials (no preferred location and orientation of the filler materials and thus do not take advantage of the alignment of the nanofillers) with low concentrations of the nanofiller, which places constraints on the types of materials that can be formed. Property enhancements could be significantly improved if control over their structure and increases in nanofiller content could be attained.

For example, traditional composites comprise high-aspect-ratio fillers at high concentrations (>50 wt %), which tend to feature anisotropic orientation of the filler phase due to their inability to pack isotropically (rods with aspect ratio 500 begin to order at ~6 vol %) (see E. A. Dimarzio, A. J. M. Yang, S. C. Glotzer. J. Res. Natl. Inst. Stan. 1995, 100, 2). This anisotropic orientation affords significant property enhancements in the plane of alignment, but less pronounced effects in other orthogonal planes, which can be of advantage in certain applications. Such high additive contents, however, have not been extensively explored in polymer nanocomposites due to high costs of the nanofillers and processing difficulties (e.g., particle aggregation).

The most frequent method for the production of nanocomposites with high (~50 wt %) loadings of nanoparticles, such as those containing clay and carbon nanotubes, is layer-by-layer assembly (LBL). This technique requires the methodical layering of polymers and nanoparticles via exposure of a substrate to alternating solutions of the composite components, typically performed by a robotic setup. The formation of the layered structure is induced during assembly by strong attractions between the individual components, which are also responsible for reinforcing the final structure, leading to impressively strong materials. While LBL can produce layered nanocomposites with excellent mechanical properties, it has a few drawbacks: limited material selection (water solubility of all components, strong attraction between components), setup cost and complexity, fabrication speed, and a narrow range of interlayer polymer composition.

Non-composite inorganic "paper-like" materials based on nanoscale components such as exfoliated vermiculite or mica platelets have been intensively studied and commercialized as protective coatings, high temperature binders, dielectric barriers, and gas-impermeable membranes. Carbon-based flexible graphite foils composed of stacked platelets of expanded graphite, have long been used in packing and gasketing applications due to their chemical resistivity against most media, superior sealability over a wide temperature range, and impermeability to fluids. The discovery of carbon nanotubes brought about bucky paper, which displays excellent mechanical and electrical properties that make it potentially suitable for fuel cell and structural composite applications, among others.

Graphite oxide (GO) is a layered material consisting of hydrophilic oxygenated graphene sheets (graphene oxide sheets) bearing oxygen functional groups on their basal planes and edges. GO-based thin films had been fabricated via solvent-casting methods as described by Titelman et al., "Characteristics and microstructures of aqueous colloidal dispersions of graphite oxide", Carbon 43, 641-649 (2005).

SUMMARY OF THE INVENTION

An embodiment of the present invention provides a macroscale composite sheet laminate comprising individual, layered graphene oxide sheets and a polymer in the spaces between the sheets so as to form a composite laminated product. The spacing between the graphene oxide sheets (intersheet spacing) can be controlled by the amount of polymer incorporated in the composite.

Another embodiment of the invention makes the composite sheet laminate by vacuum-assisted self-assembly wherein a suspension of graphene oxide and polymer dissolved in a fluid (water or organic solvent) is subjected to continuous vacuum-assisted filtration through a fluid-permeable support so that the graphene oxide sheets and the polymer are co-deposited and assembled as a laminate on this support by directional flow through the membrane filter. The laminate is dried and released from the membrane filter as a self-supporting composite laminate.

A macroscale composite sheet laminate pursuant to the present invention is advantageous in significantly outperforming many of the paper-like materials described above in stiffness and strength and in exhibiting a combination of excellent macroscopic flexibility and stiffness. The properties of the composite sheet laminate can be controlled and tuned by controlling the loading of the graphene oxide sheets and their intersheet spacing.

Practice of the invention utilizes an inexpensive process set-up to produce laminated papers or films with widely varying nanofiller content (e.g., about 30 to about 80 wt %) in relatively quick fashion (composite sheet growth rate of ~11 nm min$^{-1}$). The mechanical properties of the nanocomposites are dependent on the type of intercalated polymer (PVA or PMMA) and are significantly improved over pure component films/papers.

Other features and advantages of the present invention will become more readily apparent from the following detailed description taken with the following drawings.

DESCRIPTION OF THE DRAWINGS

FIG. 1 is a schematic representation of the VASA fabrication of nanocomposite films/papers from a solution containing both graphene oxide nanosheets and dissolved polymer. The filter membrane immobilizes graphene oxide sheets, which in turn inhibit the ability of the polymer to pass through.

FIGS. 6A through 6E are schematic diagrams depicting the ability of different intercalating species to contribute to gallery-spanning hydrogen bond bridges. All atoms engaging in hydrogen bonding are highlighted in red with the bonds themselves denoted by dashed red lines. Only the hydrogen moieties participating in hydrogen bonding are shown for clarity. FIG. 6A illustrates that anhydrous stacked graphene oxide sheets can form a small number of hydrogen bonds between surface-bound groups when the sheets are close enough to each other. FIG. 6B illustrates that water molecules, which are both hydrogen-bond donors and acceptors, between stacked graphene oxide sheets create a network of many hydrogen bonds that can readily adapt to mechanical stresses. FIG. 6C illustrates that DMF molecules between stacked graphene oxide sheets reduce the intersheet interactions due to the limited ability of DMF to hydrogen bond (it can only accept hydrogen bonds but not donate). FIG. 6D illustrates that PVA chains between stacked graphene oxide sheets increase the intersheet interactions, not only due to the ability of PVA to hydrogen bond in a similar fashion to water, but also strengthen the bond network with the covalent C—C bonds in the polymer (i.e., between the hydrogen-bonding-capable monomer units) creating a very stiff structure. FIG. 6E illustrates that PMMA chains between stacked graphene oxide sheets are similar to the DMF case, because PMMA can only accept hydrogen bonds.

DESCRIPTION OF THE INVENTION

An embodiment of the present invention envisions a macroscale laminate sheet comprising individual graphene oxide sheets layered one on top the other and a co-assembled (co-deposited) polymer to form a self-supporting film or paper-like laminated product that can be made with relatively high loading of graphene oxide sheets of greater than about 30% by weight, such as in the range of about 30 to about 80% by weight. The laminated product can have a thickness up to about 100 μm, such as in the range of about 1 to about 100 μm for purposes of illustration and not limitation. The adjective "self-supporting" is used to describe the ability of the dried film or paper-like product to support itself as a membrane during use. A macroscale film or paper-like laminate sheet pursuant to the present invention is advantageous in significantly outperforming many of the paper-like materials described above (e.g., vermiculite or mica platelet paper-like products, graphite foil, bucky paper) in stiffness and strength and in exhibiting a combination of excellent macroscopic flexibility and stiffness as a result of the interlocking-tiling arrangement of the nanoscale graphene oxide sheets, although the inventors do not wish or intend to be bound by any theory in this regard.

In an illustrative method embodiment of the present invention, a macroscale sheet laminate can be fabricated starting with a suspension of individual graphene oxide sheets and a polymer dissolved in a fluid, such as water or organic solvent, followed by assembling (co-depositing) the graphene oxide sheets and polymer of the suspension as a laminate sheet on a fluid-permeable support by flow-directed assembly. The polymer can be a hydrophilic polymer, a hydrophobic polymer, and a copolymer containing of both hydrophilic and hydrophobic units arranging either randomly or as blocks.

A particular illustrative method of fabricating a sheet laminate involves making a fluid suspension of individual graphene oxide sheets by exfoliating graphite oxide in water using an ultrasonic treatment to produce a stable suspension of the individual graphene oxide sheets with a mean lateral dimension of approximately 1 μm and sheet thickness of approximately 1 nm (corresponding to a graphene oxide nanosheet). In one embodiment of the invention, to produce a hydrophilic composite, the aqueous suspension of graphite oxide sheets is mixed with an aqueous solution of a water-soluble (dissolved) polymer and the resulting suspension is subjected to continuous vacuum-assisted filtration through a membrane filter so that the graphene oxide sheets and the water-soluble polymer are assembled (co-deposited) as a laminate on the membrane filter by directional flow of the fluid (water) of the suspension through the membrane filter.

In another embodiment of the invention to produce a hydrophobic composite, the aqueous suspension of graphite oxide sheets is diluted with into an organic solvent, such as DMF, that does not induce graphene oxide nanosheet aggregation, then mixed with an organic solution of solvent-soluble (dissolved) polymer, and the resulting suspension is subjected to continuous vacuum-assisted filtration through a membrane filter so that the graphene oxide sheets and the solvent-soluble polymer are assembled (co-deposited) as a laminate on the membrane filter by directional flow of the fluid (water) of the suspension through the membrane filter. The laminate is then dried (e.g., air dried) and mechanically released (e.g., peeled) from the membrane filter as a thin, self-supporting laminate (sheet, film, or paper) comprising individual graphene oxide sheets layered on top of one another and the polymer between at least some of the graphene oxide nanosheets in a manner to form a self-supporting film or paper-like laminated product. Further details of this fabricating method are set forth in the EXAMPLE below.

The following EXAMPLE is offered to further illustrate the present invention but not limit the present invention.

EXAMPLE

The Example illustrates the preparation of highly ordered, homogeneous polymer nanocomposites of layered graphene oxide and polymer using a vacuum-assisted self-assembly (VASA) technique. In VASA, all the components are pre-mixed prior to assembly under a flow, making it compatible with either hydrophilic poly(vinyl alcohol) (PVA) or hydrophobic poly(methyl methacrylate) (PMMA) for the preparation of composites with over 50 wt % filler. The nanosheets within the VASA-assembled composites exhibit a high degree of order with tunable intersheet spacing depending on the polymer content. Graphene oxide-PVA nanocomposites, prepared from water, exhibit greatly improved modulus values in comparison to films of either pure PVA or pure graphene oxide. Modulus values for graphene oxide-PMMA nanocomposites, prepared from dimethylformamide (DMF), are intermediate to those of the pure components. The differences in structure, modulus, and strength can be attributed to the gallery composition, specifically the hydrogen-bonding ability of the intercalating species.

Materials. All materials were used as received unless otherwise noted. SP-1 graphite powder was received from Bay Carbon (Bay City, Mich.). Polyvinyl alcohol (PVA, 70,000 MW) was obtained from Aldrich (Milwaukee, Wis.). Poly (methyl methacrylate) (PMMA, 254,700 MW) was received from Pressure Chemical Co. (Pittsburgh, Pa.). N,N-dimethylformamide (DMF, 99.8%) was obtained from Aldrich (Milwaukee, Wis.). Ultrapure deionized water (resistivity >18 MΩ·cm) was collected from a Mili-Q Biocel system.

Whatman (Whatman, Piscataway, N.J.) Anodise™ membranes (0.2 µm pore size, 47 mm diameter) were used during filtration for support of fabricated papers. Cellulose Spectra/ Pore Membrane dialysis tubing (Spectrum Laboratories, Rancho Dominguez, Calif.), having 6-8 kD molecular weight cutoff (MWCO), was utilized for removing excess ions after graphene oxide synthesis. Sonication was preformed using a Fisher Scientific FS60 (150 W) bath sonicator. An Eppendorf model 5804 R centrifuge was employed for centrifugation.

Materials synthesis. Graphite was first oxidized to graphite oxide using a modified Hummers method [see: a) Hummers, W. S.; Offeman, R. E. *J. Am. Chem. Soc.* 1958, 80, 1339-1339; b) Kovtyukhova, N. I.; Ollivier, P. J.; Martin, B. R.; Mallouk, T. E.; Chizhik, S. A.; Buzaneva, E. V.; Gorchinskiy, A. D. *Chem. Mater.* 1999, 11, 771-778], the disclosures of which are incorporated herein by reference. Bulk graphite oxide is typically prepared by subjecting SP-1 graphite powder (30 µm, Bay Carbon, Bay City, Mich.) to an oxidative treatment with potassium permanganate in concentrated sulfuric acid. For example, graphite powder (5 g) was first pre-oxidized by vigorously stirring for 6 h in a mixture containing concentrated $H_2SO_4$ (15 mL), $K_2S_2O_8$ (10 g), and $P_2O_5$ (10 g). The pre-oxidized powder was filtered, washed with water (3×50 mL), and dried at 50° C. overnight. This dried powder was then stirred at 35° C. for 2 days in a mixture of concentrated aqueous $H_2SO_4$ (125 mL) and $KMnO_4$ (17 g) to afford graphite oxide. This product was then purified by five cycles of resuspension in deionized water (30 mL) and then centrifugation at 8,000 rpm for 30 min, to remove residual metal cations.

Exfoliation of graphite oxide into nanosheets was achieved by sonicating an aqueous suspension of graphite oxide (250 mL, 10 mg mL$^{-1}$) for 1 h in a bath sonicator. Un-exfoliated aggregates were removed from solution via centrifugation at 8,000 rpm for 15 min, with the supernatant reserved. Dialysis of the supernatant in ultrapure deionized water was performed to remove any residual metal ions from the aqueous dispersion. The remaining dispersion of graphene oxide nanosheets inside the dialysis tube was collected and used for sample preparation. Complete exfoliation of the graphene oxide nanosheets was confirmed by the absence of a diffraction peak in the XRD pattern of a freeze-dried powder prepared from an aliquot of the dispersion.

To prepare the graphene oxide-polymer composites, the as-prepared aqueous dispersion of graphene oxide was further diluted with ultrapure deionized water (9:1 v/v). Organic dispersions of graphene oxide were prepared by diluting the as-prepared aqueous dispersion with DMF (9:1 v/v).

Composite solution preparation. Composite solutions of graphene oxide and PVA were prepared by adding a diluted aqueous graphene oxide dispersion (30 mL, 1 mg mL$^{-1}$) dropwise to the appropriate aqueous solution of PVA (10-90 mg in 20 mL of water).

Figure 9:
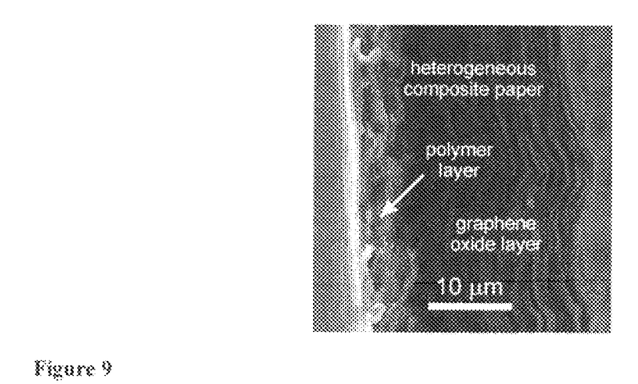
FIG. 9 shows an SEM image of the bilayer structure in a heterogeneous graphene oxide-PMMA nanocomposite.

Graphene oxide and PMMA composite solutions were formed by adding a diluted graphene oxide dispersion in DMF (30 mL, 1 mg mL$^{-1}$) dropwise to the appropriate solution of PMMA (10-30 mg in 400 mL of DMF). Combining graphene oxide dispersions in DMF with solutions containing larger amounts of PMMA (>60 mg) resulted in the formation of PMMA aggregates, yielding papers with a bilayer structure and no increase in gallery spacing (see FIG. 9).

Paper fabrication. Graphene oxide and polymer composite papers were prepared by filtering diluted graphene oxide dispersions (aqueous or DMF) or composite dispersions (graphene oxide with PVA or PMMA), respectively, through a Whatman Anodisc™ filter membrane. A Kontes Ultra-ware microfiltration apparatus equipped with a fritted-glass support base and either a 250-mL or a 500-mL reservoir to hold the respective dispersions was utilized for vacuum filtration.

Polymer film fabrication. PVA films were prepared by casting a 10 wt % aqueous solution (15 mL) in a Teflon petri dish. Films were left to dry for 4 days before removal from the dish.

PMMA films were prepared by casting a 1 wt % DMF solution in a glass petri dish. Films were left to dry for 3 days before heating to 100° C. The heated films were left to dry for 4 days before removal from the dish.

Fabrication time. VASA filtration of aqueous graphene oxide dispersions (30 mL, 1 mg mL-1) required ~18 h to afford ~12 μm thick films of graphene oxide, for an overall rate assembly rate of ~11 nm min$^{-1}$. Analogous organic dispersions in DMF required ~24 h of assembly time to form similarly thick papers (~8 nm min$^{-1}$). While assembly of composite paper samples was more time-intensive, due to their increased thickness, the overall assembly rate varied only slightly from that of pure graphene oxide papers (~7 to ~12 nm min$^{-1}$). Low-polymer-content composites (PVA-II, PVA-III, PMMA-II, and PMMA-III) required ~36-40 h to form, while high-polymer-content composites (PVA-I and PMMA-I) took 40-48 h. PMMA-based composites prepared from DMF consistently required longer assembly times than PVA-based composites.

Characterization. Transmission electron microscopy (TEM) images were collected using a Hitachi H-8100 TEM (composite PVA-II) (Hitachi High Technologies America, Inc., Pleasanton, Calif.) and a Hitachi HD-2300A (pure graphene oxide paper) STEM at 200 keV. Samples were prepared by slicing sections (55 to 80-nm thick) perpendicular to the ordered plane of graphene oxide or graphene oxide-polymer nanocomposite papers using an ultramicrotome, followed by deposition onto a copper grid.

Scanning electron microscope (SEM) images were gathered using a field-emission gun Nova NanoSEM 600 (FEI Co., Hillsboro, Oreg.) microscope. Samples were affixed vertically to an aluminum stub with the fracture edge of the paper toward the electron gun.

Figure 7A:
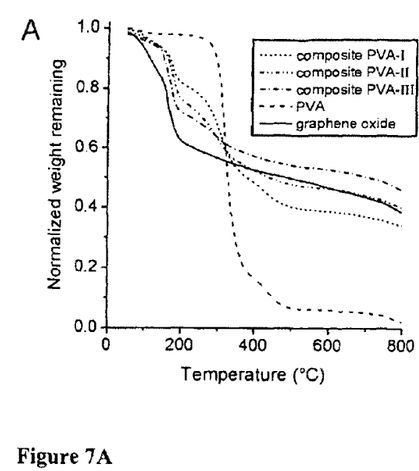
FIG. 7A shows thermogravimetric analysis (TGA) profiles for pure graphene oxide paper and PVA films, along with composites, prepared from water.
Figure 7B:
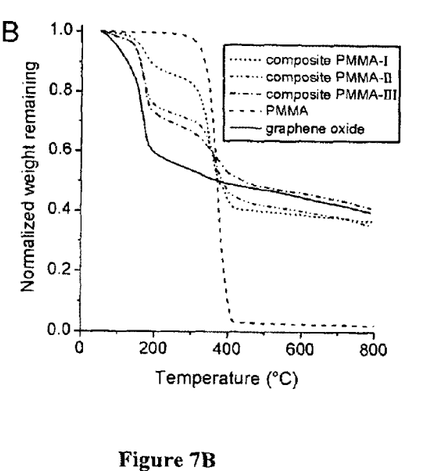
FIG. 7B shows TGA profiles for pure graphene oxide paper and PMMA films, along with composites, prepared from DMF. The labels for each profile refer to the graphene oxide-polymer nanocomposites listed in Table 1. TGA of all pure and composite samples was performed using a TGA/SDTA851 analyzer (Mettler-Toledo, Columbus, Ohio) with samples heated in alumina crucibles from 50 to 800° C. in a flowing $N_2$ atmosphere with a scanning rate of 10° C. $min^{-1}$.

Thermogravimetric analysis (TGA) of all pure and composite samples (FIG. 7) was performed using a Mettler Toledo TGA/SDTA851 analyzer (Mettler-Toledo, Columbus, Ohio). Samples (~3 mg) were heated in alumina crucibles from 50 to 800° C. in a flowing $N_2$ atmosphere with a scanning rate of 10° C. min$^{-1}$.

Mechanical properties were evaluated using an RSA III (TA Instruments, New Castle, Del.) dynamic mechanical analyzer (DMA). Samples for testing (2- to 6-mm wide and 20- to 40-mm long) were prepared from fabricated sheets of paper by compression-cutting with the sharp edge of a razor blade. Uniaxial tensile measurements were carried out in air at ambient temperature (~25° C.), circumventing the need for equilibration. Stress-strain curves of all samples were collected at a crosshead rate of 0.001 mm/s. The maximum slope of the curve was recorded as the Young's modulus, while tensile strength was determined from the highest stress the material could withstand before breaking. Storage modulus (E') was measured as the high strain plateau in an oscillatory strain sweep from 0.001 to 0.1% strain, and thus exhibited a smaller sample distribution than the data from a stress strain curve. The Young's moduli obtained from a stress-strain test corresponded closely to the E' result from a strain sweep at constant frequency.

Powder X-ray diffraction (PXRD) data for 2θ values ranging from 1° to 5° were collected with a Rigaku 2000 diffractometer (Rigaku Americas, Inc., The Woodlands, Tex.) with nickel-filtered Cu Kα radiation (λ=1.5406 Å). Data from 5° to 20° were obtained using a Giegerflex Rigaku diffractometer with nickel-filtered Cu Kα radiation (λ=1.5406 Å).

Figure 1:
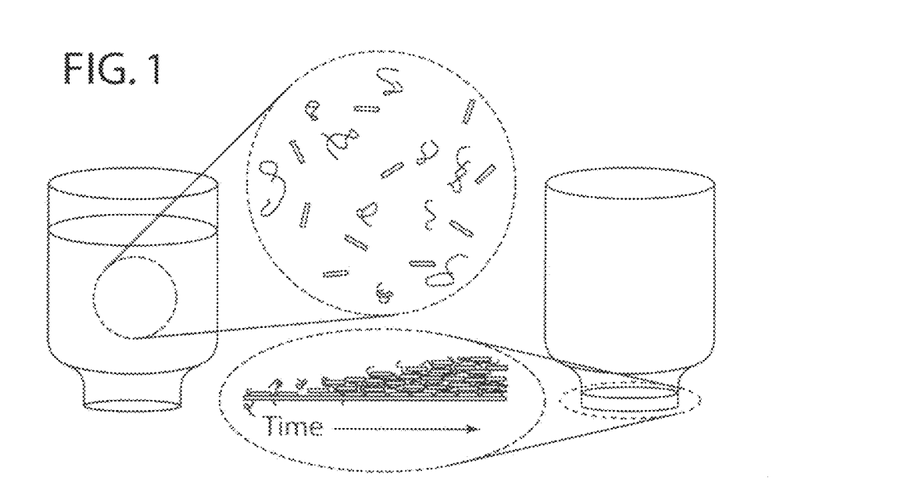

To successfully fabricate graphene oxide-polymer nanocomposites via VASA, parent dispersions containing both graphene oxide nanosheets and dissolved polymer, where neither component aggregates during VASA-assembly (FIG. 1), must first be prepared. Poly(vinyl alcohol) (PVA) and poly(methyl methacrylate) (PMMA) were selected as model hydrophilic and hydrophobic polymers, respectively, due to the extensive mechanical data available for these polymers and their nanocomposites. Because graphene oxide nanosheets are highly functionalized with oxygen-containing functional groups, they can be readily dispersed in water under mild ultrasonic treatment. To produce hydrophilic graphene oxide-polymer nanocomposites, such dispersions need merely be mixed with an aqueous solution of PVA prior to filtration as described above. Fabrication of the corresponding hydrophobic composites requires an additional processing step, where aqueous graphene oxide dispersions must first be diluted into a good solvent such as N,N-dimethylformamide (DMF), which does not induce nanoparticle aggregation. This organic graphene oxide dispersion can then be combined with a DMF solution of PMMA to give the required parent graphene oxide-polymer mixture as described above.

Figure 2A:
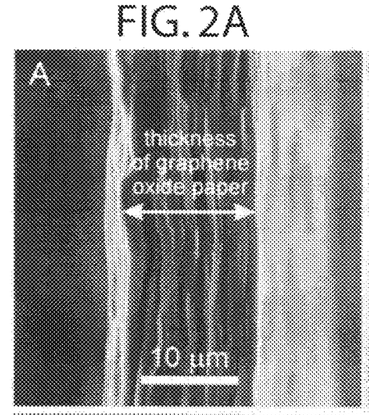
FIG. 2A is a SEM image of graphene oxide paper.
Figure 2B:
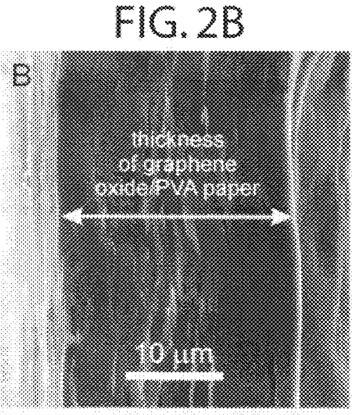
FIG. 2B is a SEM image of nanocomposite PVA-II (60 wt % graphene oxide: 34 wt % PVA), demonstrating increased thickness after intercalation of PVA.
Figure 2C:
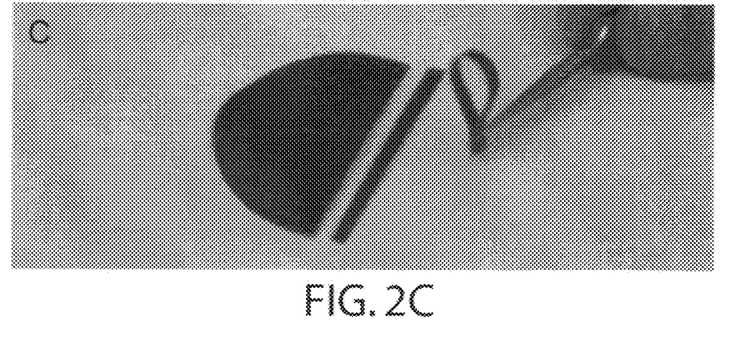
FIG. 2C is a photographic image of nanocomposite PVA-II after fabrication with removed sections used for mechanical analysis.

When the parent graphene oxide-polymer dispersion is first filtered through a filter membrane, some of the polymer chains initially pass through (FIG. 1); however, this process is quickly hindered by the deposition of graphene oxide nanosheets, which cannot pass through, on the membrane surface. This newly formed graphene oxide film reduces further polymer loss, resulting in homogeneous deposition of both nanosheets and polymer within the fabricated nanocomposite: the graphene oxide sheets and the polymer chains deposit on top of each other as the thickness of the nanocomposite increases. While solvent molecules can diffuse slowly through the growing brick-and-mortar structure of the nanocomposite, the polymer remains intercalated in the intersheet gallery, which is significantly smaller (≤2.2 nm) than the radius of gyration ($R_g$) of the polymer chains (9 nm for a 70-kDa PVA and 17 nm for a 254-kDa PMMA). At the end of the filtration, the nanocomposites can be collected after a brief air-drying period, yielding macroscopic paper-like samples with thicknesses ranging from 10 to 30 μm (FIGS. 2B-2C).

As mentioned above, because some polymer from the parent dispersion does pass through the membrane during fabrication, not all of the initially dissolved polymer is retained in the fabricated nanocomposites. However, significant fractions of the initial polymer loadings (up to 84 wt %, Table 1) are retained for both PVA and PMMA nanocomposite papers as confirmed by thermogravimetric analysis (TGA, FIGS. 7A and 7B). The features in the TGA curves of the nanocomposites are essentially superpositions of the features from the TGA curves of the pure materials. As such, quantification of polymer content in the nanocomposites was easily done by normalizing the TGA curves of the nanocomposites to those of the respective pure polymers. The curve for pure PVA exhibited a two-step mass loss process: a major loss step in the 270-380° C. range and a smaller loss between 380° C. and 480° C., leaving only ~6% of the original sample mass. Pure PMMA decomposed at a higher temperature range (310 to 440° C.), with only one mass loss feature that accounted for ~97% of the original sample mass. As controls, the TGA curves for graphene oxide paper, prepared by filtering only graphene oxide dispersions in water or DMF, were nearly identical to each other.

A comparison of the scanning electron microscope (SEM) images of graphene oxide paper (FIG. 2A), prepared in water with 30 mg of graphene oxide, and composite PVA-II (FIG. 2B), which was prepared from a solution containing 30 mg graphene oxide and 30 mg PVA, clearly demonstrates homogeneity in both VASA-prepared structures. That composite PVA-II was significantly thicker (~28-μm thick) than pure graphene oxide paper (~12-μm thick), while both contain the same amount of graphene oxide, indicates significant incorporation of PVA into the structure of composite PVA-II. While homogeneity was observed in all PVA samples, initial attempts to fabricate nanocomposites with high PMMA content (75 wt % loading) generated heterogeneous regions containing only polymer. These heterogeneous papers exhibited a shiny, polymer-like surface on one side and a dull graphene oxide-like side on the obverse. Formation of such heterogeneities could be attributed to the relatively high water content (~5 wt %) in the nanocomposite solution prior to filtration, and were prevented by higher dilution in DMF to reduce the water content in the pre-filtered solution to below 0.5 wt %.

Figure 3A:
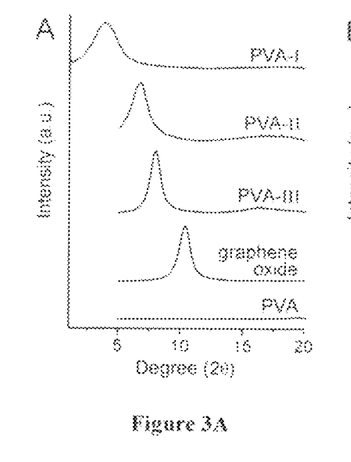
FIG. 3A shows the XRD patterns of papers and films prepared from water.
Figure 3B:
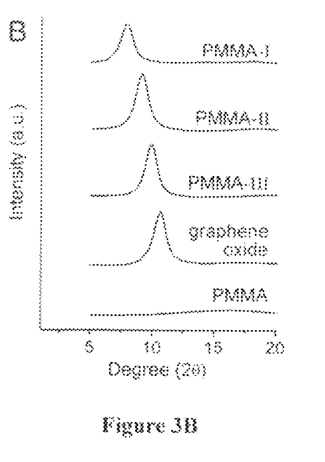
FIG. 3B shows the XRD pattern of papers and film prepared from DMF. The labels on each pattern refer to the graphene oxide-polymer nanocomposites listed in Table 1.
Figure 8:
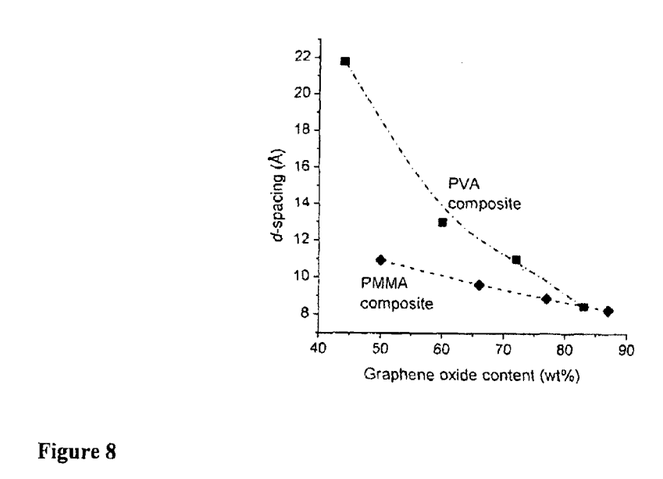
FIG. 8 is a plot of intersheet spacing (d-spacing) against the graphene oxide content of composite and pure graphene oxide paper samples.

From the high degree of order observed in directed flow-assembled graphene oxide paper (FIG. 2A), the VASA-assembled polymer nanocomposite papers exhibited similarly good order with well-defined spacing between adjacent graphene oxide sheets. In contrast to the featureless X-ray diffraction (XRD) patterns of solution-cast films of pure polymers (FIG. 3A, 3B), the XRD patterns of our graphene oxide-polymer nanocomposite papers exhibited sharp peaks, indicating that the graphene oxide nanosheets had packed into an ordered structure, as also suggested by the corresponding SEM image (FIG. 2B). Nanocomposite papers containing smaller amounts of graphene oxide exhibited larger intersheet spacings (Table 1) that decreased with higher graphene oxide concentrations, consistent with having a smaller amount of polymer intercalating between adjacent graphene oxide layers. Indeed, a direct correlation between increasing graphene oxide content and decreasing intersheet spacing was observed for both PVA- and PMMA-based graphene oxide nanocomposite papers (FIG. 8).

As shown in Table 1, the intersheet spacings for PVA-based nanocomposites were significantly larger than those of PMMA-based materials with similar graphene oxide/polymer mass ratios. This observation may be explained by the distinctly different interactions that PVA and PMMA would have with graphene oxide. Hydrophilic PVA, with its numerous hydroxyl groups would likely interact well with the hydrophilic surface of graphene oxide via hydrogen bonding (see below), leading to "full" interaction between both components and resulting in large changes of intersheet spacing with small modification of the composition (increasing PVA content by 21% causes a 2.51-Å increase in spacing). Conversely, interactions between the hydrophobic methacrylate groups of PMMA and graphene oxide would be discouraged. As such, PMMA chains would likely remain in coiled conformations, which would more efficiently pack within the intersheet gallery, fitting well into the undulating, wavy structures of the nanosheets in graphene oxide paper. Such behavior would account for the relatively small increases in intersheet spacing for graphene-oxide-PMMA nanocomposites even at high polymer concentrations (increasing PMMA content by 50% only causes a 2.64-Å increase in spacing).

TABLE 1

Composition, spatial, and averaged mechanical properties of nanocomposite samples

| | Theoretical graphene oxide content (wt %)* | Experimental graphene oxide content (wt %)† | Experimental polymer content (wt %)† | Experimental solvent content (wt %)† | Intersheet Spacing (Å) | Storage Modulus (GPa) | Young's Modulus (GPa) | Tensile Strength (MPa) | Strain to failure (%) |
|---|---|---|---|---|---|---|---|---|---|
| PVA | 0 | 0 | 98 | 2 | NA | 3.6 | 2.6 | 28 | 14.20 |
| composite PVA-I | 25 | 44 | 49 | 7 | 22.06 | 26.0 | 22.2 | 67.5 | 0.34 |
| composite PVA-II | 50 | 60 | 34 | 6 | 13.12 | 40.3 | 36.4 | 80.2 | 0.25 |
| composite PVA-III | 75 | 72 | 21 | 7 | 10.97 | 36.3 | 27.6 | 71.0 | 0.27 |
| Graphene oxide paper from H$_2$O | 100 | 83 | 0 | 17 | 8.48 | 17.6 | 16.6 | 149.4 | 1.65 |
| PMMA | 0 | 0 | 97 | 3 | NA | 0.87 | 0.67 | 12.2 | 6.90 |
| composite PMMA-I | 25 | 49 | 50 | 1 | 10.90 | 12.4 | 7.1 | 40.5 | 0.90 |
| composite PMMA-II | 50 | 66 | 31 | 3 | 9.60 | 8.8 | 6.0 | 102.9 | 2.58 |
| composite PMMA-III | 75 | 77 | 20 | 3 | 8.88 | 10.1 | 7.5 | 148.3 | 3.17 |
| Graphene oxide paper from DMF | 100 | 87 | 0 | 13 | 8.26 | 13.1 | 10.8 | 119.0 | 2.13 |

*Theoretical polymer content (wt %) is the remaining mass after subtracting the theoretical graphene oxide content from the mass of the composite.
†Determined using TGA (FIG. 7).

Figure 4A:
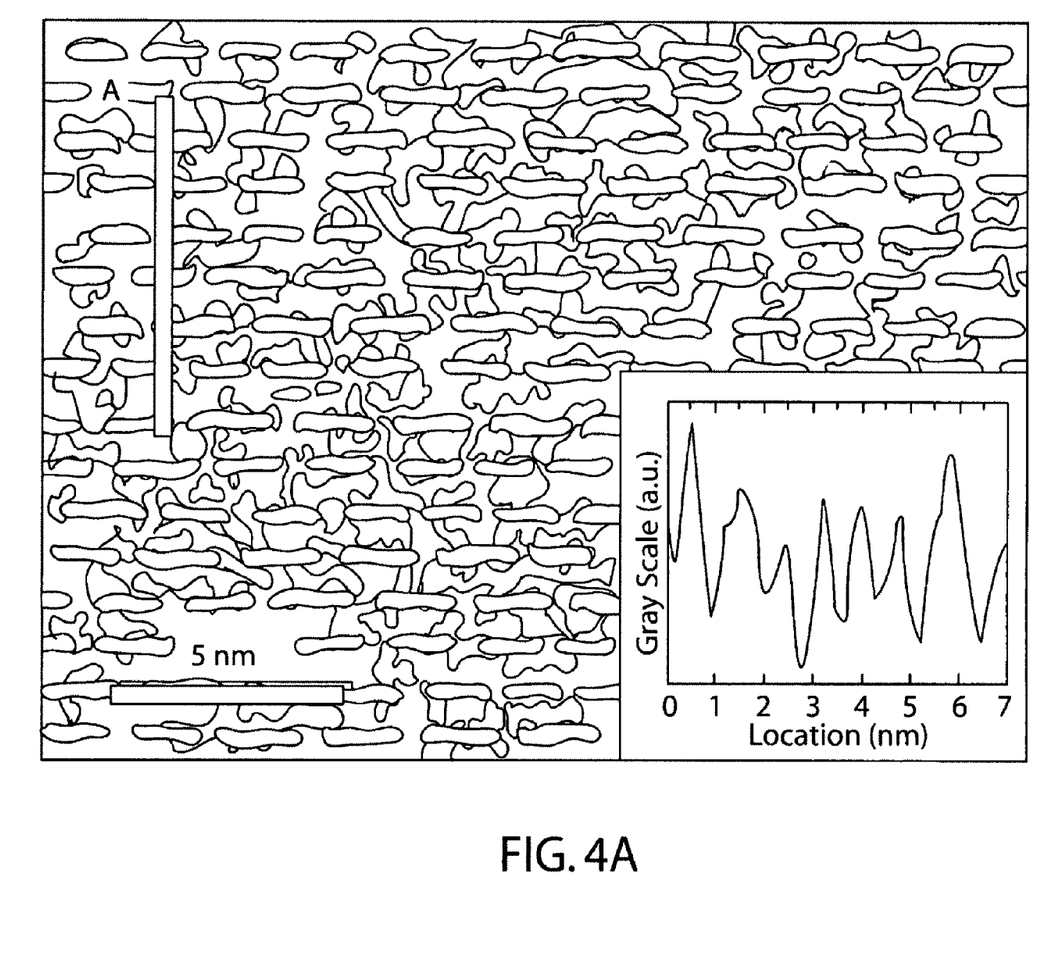
FIG. 4A is a HR-TEM image taken perpendicular to the width of a paper sample of graphene oxide deposited from $H_2O$.
Figure 4B:
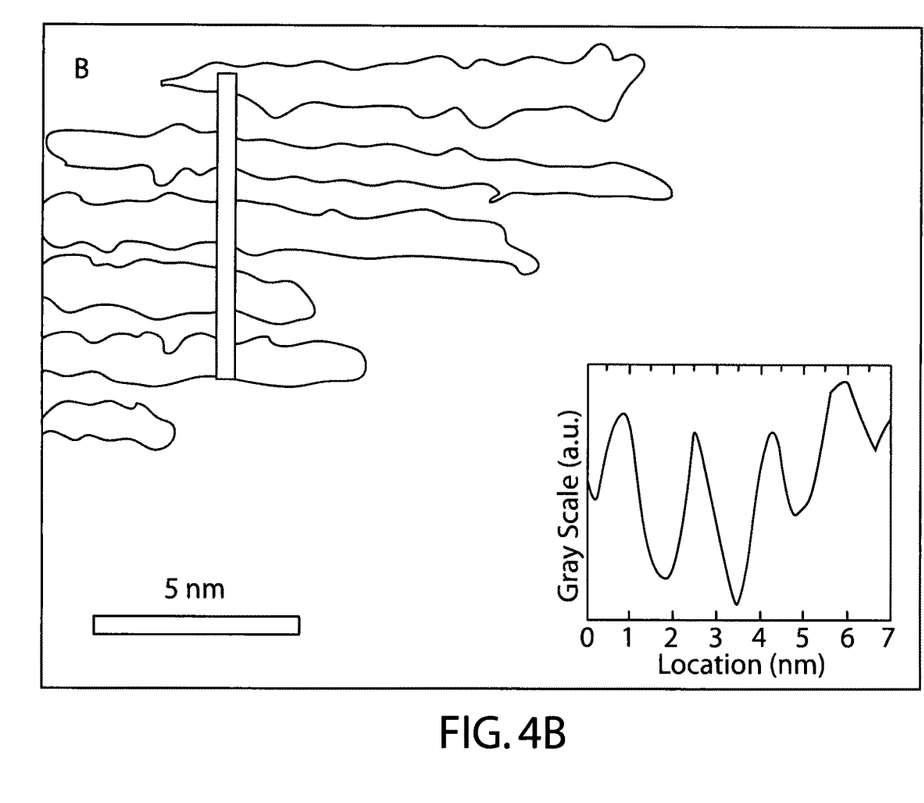
FIG. 4B is an HR-TEM image taken perpendicular to the width of a paper sample of graphene oxide deposited from VASA-prepared composite PVA-II (60 wt % graphene oxide: 34 wt % PVA). The inset shows the variation in grayscale along the line scan overlayed on the image, clearly demonstrating the increased interlayer spacing of the composite. The alternating dark-and-light stripe patterns in each image represent the graphene oxide nanosheets and the intergallery space, respectively.

High-resolution transmission electron microscopy (FIR-TEM) analysis of the nanocomposite films (FIG. 4A, 4B) confirm both the well-ordered structure of the graphene oxide nanosheets, along with the change in intersheet spacing upon varying the nanofiller concentration. Line scans of the HR-TEM images (insets, FIGS. 4A and 4B) elucidate both the layered structure and the increase in intersheet spacing in composite PVA-II, which contains 60 wt % graphene oxide and 34 wt % PVA, from that of a sample of graphene oxide paper deposited from water. The intergallery spacing averaged from several line scans in different images, reveals a 16.4-Å average intergallery spacing for composite PVA-II and a 8.7 Å average spacing for graphene oxide from water, which are comparable to the values obtained from XRD (13.12 and 8.48 Å, respectively).

All fabricated nanocomposite papers were mechanically robust, as shown by their measured mechanical properties (Table 1), obtained using a minimum of five sections from each sample. While the room-temperature (23.0-24.5° C.) storage and Young's moduli of the graphene oxide-PMMA nanocomposites were intermediate between those of PMMA films and graphene oxide paper deposited from DMF (FIG.

Figure 5A:
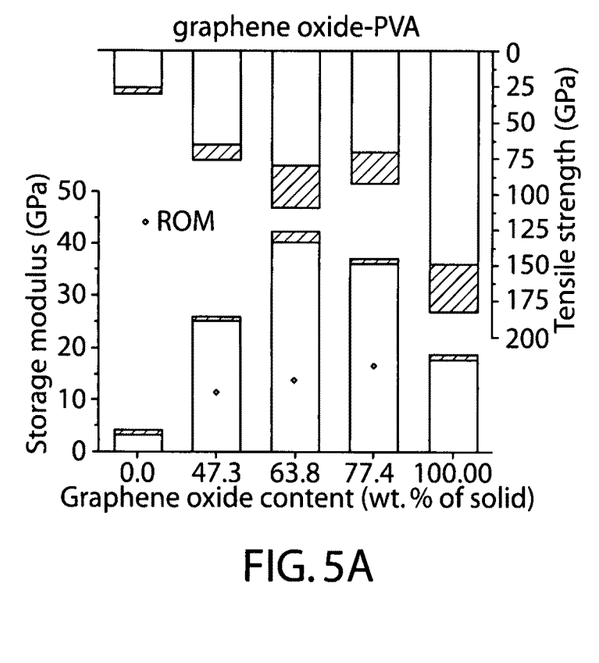
FIGS. 5A and 5B show storage moduli and tensile strengths of PVA-based nanocomposites and pure-component films/papers prepared from water (FIG. 5A) and PMMA-based nanocomposites and pure-component films/papers prepared from DMF (FIG. 5B). The average and maximum values for the mechanical data are shown by the white and shaded bars, respectively. Theoretical modulus values are shown as calculated by the rule of mixtures (ROM).
Figure 5B:
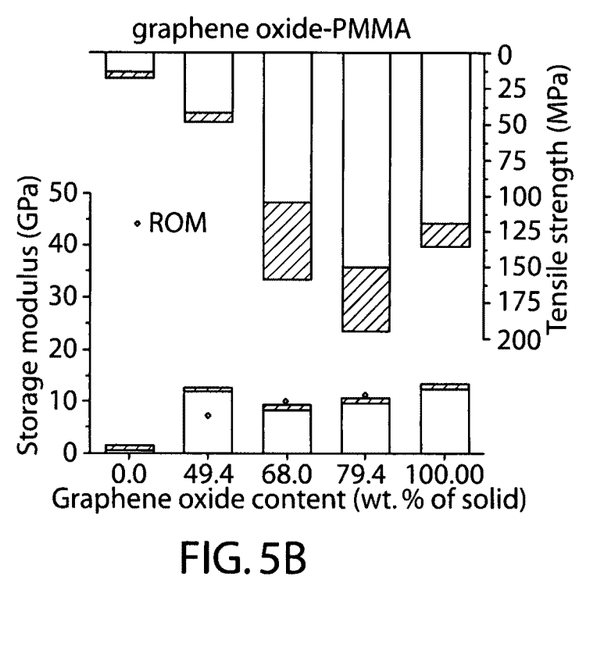

5B), these moduli values for the graphene oxide-PVA nanocomposites were much greater than those for the corresponding pure-component samples (FIG. 5A). From a first-order consideration, this contrast may be attributable to the differences in interaction between the two polymers and the graphene oxide. Given the presence of hydrophilic oxygen-containing functional groups (primarily epoxy and hydroxyl) on the surface of the graphene oxide sheets, PVA should interact much better with graphene oxide via hydrogen bonding than hydrophobic PMMA.

In the aforementioned Example, the importance of hydrogen bonding in increasing the mechanical strength of graphene oxide-PVA nanocomposites is supported by the observation of drastic variance in mechanical strength and stiffness between hydrated and anhydrous graphene oxide paper. As prepared, graphene oxide paper is hydrophilic, with a significant amount of water in the gallery layer. When water is completely removed, as achieved when the samples are heated over 100° C., the graphene oxide paper structure loses all of its mechanical integrity. Thus, water must play a critical role in mediating the interactions between adjacent sheets, most likely via a hydrogen-bonding network (FIG. 6B) formed between epoxide (hydrogen-bond acceptor) and hydroxyl (both hydrogen-bond acceptor and donor) groups on the graphene oxide surfaces. This network could transfer stress and act to stiffen the sample. Such bridging between adjacent sheets would not occur as extensively in completely dehydrated graphene oxide paper (FIG. 6A).

Figure 6A:
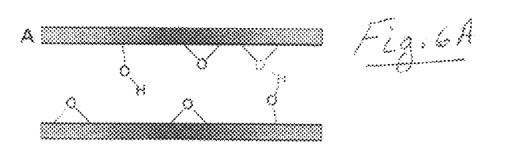
Figure 6B:
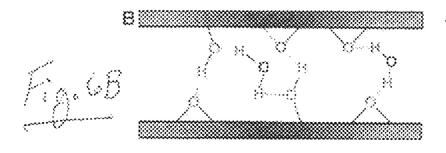

Although not wishing to be bound by any theory, we suggest that the presence of water in the gallery between graphene oxide nanosheets can significantly increase the degrees of freedom associated with the creation of a gallery-bridging hydrogen bond network (FIG. 6B). Such a network would be sparse in anhydrous stacked graphene oxide sheets, whose oxygen-containing functional groups are too rigid and far apart to maximize hydrogen bonding within the intersheet gallery (see below). Adding water molecules, which have rotational and translational degrees of freedom that the functional groups bound to the sheets do not, to the gallery would then bridge these gaps and increase the network density. The ability of water molecules to serve as both hydrogen bond acceptor and donor simultaneously makes them "universal adapters" for the formation of such a network. Single water molecules would likely form the majority of bridges, but two or more molecules could participate in the hydrogen bond network where large gaps exist between groups on adjacent sheets. These transitory networks, which rely on multiple hydrogen bonds, may be less efficient in increasing the stiffness of the stack than a single, direct hydrogen bond between adjacent graphene oxide sheets; however, this inefficiency is overcome by a richer, more extensive intersheet bond network that would allow for more links between sheets with high flexibility to better adapt to irregular gallery spacing and mechanical stresses.

When graphene oxide paper is dried, the absence of water would greatly reduce the ability of adjacent sheets to interact via hydrogen bonds (FIG. 6A). For example, if the functional groups across adjacent sheets are only capable of hydrogen-bond accepting (or conversely, hydrogen-bond donating), interaction cannot occur, limiting the number of gallery-bridging hydrogen bonds. A second issue in fully dehydrated graphene oxide paper is that the rigidity of the sheets greatly limits the translational and rotational degrees of freedom of the surface groups, reducing the possibility of hydrogen bond formation. As such bonds only occur over a short distance (<3 Å), specific orientation of the interacting groups is required for their formation.

Figure 6C:
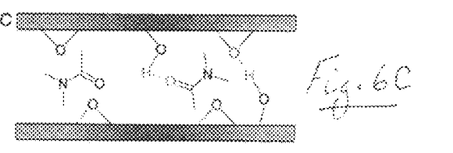

The importance of the intergallery network of hydrogen bonding is highlighted by the observed low storage modulus of graphene oxide paper deposited from DMF. Since DMF can only serve as a hydrogen bond acceptor via its amide oxygen (FIG. 6C), the extent of hydrogen bonding in this system are significantly lower than that in water-deposited graphene oxide paper. Such an effect is apparent from the significantly lower storage modulus value of graphene oxide paper prepared from DMF, which is 26% lower than that of graphene oxide paper prepared from water (Table 1 and FIG. 5A, 5B).

Figure 6D:
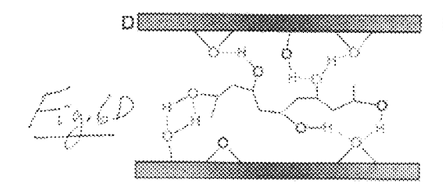

In the graphene oxide-PVA nanocomposites, the hydrophilic PVA chains in the gallery spacing serve a similar role as water in facilitating an extensive intergallery hydrogen-bonding network, but with much improved strength due to the covalent C—C bonds linking the hydrogen-bonding-capable monomer units. In other words, the increased storage moduli values observed in graphene oxide-PVA nanocomposites are the result of a hybrid hydrogen/covalent bonding network (FIG. 6D), where the pendant hydroxyl groups of PVA chains interact with the oxygen-containing groups on the graphene oxide surfaces via hydrogen bonding. The PVA hydroxyl groups are similar to water in that they can act as both hydrogen-bond acceptors and donors; however, the covalent bonds in the PVA polymer chain make it a stronger, multi-connected bridge compared to an array of water molecules. Thus the impact of PVA on composite modulus significantly exceeds simple rule-of-mixtures calculations (FIG. 5A).

Figure 6E:
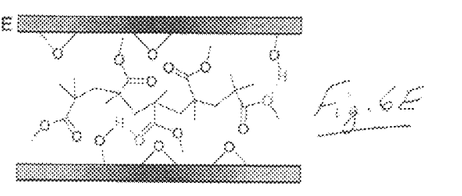

Consistent with the hydrogen-bonding network model is the observation that the storage moduli of graphene oxide-PVA nanocomposites varied widely with changes in the graphene oxide content (FIG. 5A) while those for graphene oxide-PMMA nanocomposites remained relatively independent of the filler loading (FIG. 5B). As the amount of the nanofiller was increased, it significantly reinforced the hydrogen bonding network of PVA-based composites. In contrast, the moduli for PMMA-based composites were only minimally affected by changes in nanofiller content. While placing PMMA chains within the intergallery space (FIG. 6E) offers the potential for mechanical improvement through the covalent polymer backbone, PMMA suffers from the same interaction difficulty as DMF in that it can only act as a hydrogen-bond acceptor through the ester functional group on the side chain. The hydrophobicity and steric hindrance of the methyl groups of the methacrylate side chains would further limit the weak interactions between PMMA and graphene oxide, accounting for the lower moduli found for graphene oxide-PMMA nanocomposites, which closely adhere to rule of mixtures calculation.

The aforementioned hydrogen bonding model also appears to explain the ultimate failure behavior (tensile strength and strain to failure) of pure graphene oxide and graphene oxide-polymer nanocomposite papers. Once the stress reaches a sufficient level to break hydrogen bonds between the water molecules and oxygen-containing functionalities on the graphene oxide surface, the sheets are able to accommodate some local sliding to relieve the build up of stress. Given their rapid translational and rotational dynamics, the water molecules are able to form new hydrogen bonds with the graphene oxide surfaces as sliding occurs, thereby accommodating higher stresses and yielding a moderate strain to failure. In contrast, the PVA-based nanocomposites fail in a brittle manner at significantly lower strains because the PVA chains have comparatively lower mobility than water molecules and thus are unable to reform ruptured hydrogen bonds. Because the hydrogen bonding network between the graphene oxide surface with PMMA is less extensive, the PMMA composite intergallery network closely resembles that of the graphene oxide paper from DMF. Accordingly, the tensile strength and strain to failure of graphene oxide-PMMA nanocomposites with low contents of PMMA do not deviate dramatically from that of pure graphene oxide paper from DMF. However, a higher PMMA-to-solvent ratio yields glassier behavior of the intergallery PMMA, thereby limiting both the ability of sheets to slide and the rearrangement of intergallery contents. Thus, the strength of graphene oxide-PMMA nanocomposites approaches that of pure PMMA.

The Example described in this application demonstrates vacuum-assisted self-assembly (VASA) as a facile, inexpensive, processing technique for the production of layered graphene oxide-polymer nanocomposites. The VASA process is amenable to either hydrophobic (PMMA) or hydrophilic (PVA) polymers, affording their homogeneous incorporation into the intersheet spacing of the graphene oxide with a wide range of high-nanofiller content (44 to 77 wt %). Not only does VASA provides access to compositions that were not previously available, its facile production of both hydrophobic and hydrophilic nanocomposites has allowed for the recognition that hydrogen bonding plays a critical role in the mechanical properties of both pure graphene oxide and composite paper samples, similar to the role of hydrogen bonding in spider silk. Just as water can serve as a "universal adapter" for the formation of gallery-bridging hydrogen bonds, PVA also forms an efficient hybrid hydrogen/covalent bonding network between adjacent sheets, which increases moduli values above that of pure graphene oxide paper. However, given the presence of covalent bonds between its hydrogen-bonding groups, PVA cannot adapt easily as water to fracture situations, introducing a brittle fracture mechanism by its incorporation.

While PVA is not a major structural polymer, the Example described in this application also demonstrates the flexibility of VASA to incorporate one such polymer (PMMA) with the same ability to vary nanofiller loading. Poor interaction between the graphene oxide sheets with hydrophobic PMMA limits improvement in stiffness at high nanofiller concentration, but the good dispersion of PMMA within the nanocomposite affords moduli values closely matching those expected from the rule of mixtures throughout the content range studied.

Although the invention has been described above with respect to certain embodiments, it is not limited to such embodiments since changes, modifications and omissions can be made thereto within the scope of the invention as defined in the appended claims.

References which are incorporated herein by reference:
[1] W. S. Hummers, R. E. Offeman, *J. Am. Chem. Soc.* 1958, 80, 6.
[2] N. I. Kovtyukhova, P. J. Ollivier, B. R. Martin, T. E. Mallouk, S. A. Chizhik, E. V. Buzaneva, A. D. Gorchinskiy, *Chem. Mater.* 1999, 11, 771.

The invention claimed is:

1. A method of making a graphene oxide composite sheet laminate paper, said method comprising:
   (a) forming a mixture comprising individual graphene oxide sheets, a polymer and a solvent;
   (b) depositing said mixture to a top surface of a filtration membrane; and
   (c) forming said graphene oxide composite sheet laminate paper on said top surface of said filtration membrane by applying a vacuum to a bottom surface of said filtration membrane,
   wherein said graphene oxide composite sheet laminate paper comprises an ordered nanocomposite having individual graphene oxide sheets layered on top of one another and the polymer between at least some of the individual graphene oxide sheets said ordered nanocomposite having a periodicity pattern of the polymer between at least some of the individual graphene oxide sheets.

2. The method of claim 1 further comprising drying the graphene oxide composite sheet laminate paper on said filtration membrane and subsequently releasing the dried graphene oxide composite sheet laminate paper from the filtration membrane as a self-supporting laminate paper.

3. The method of claim 1, wherein said polymer is a hydrophilic polymer.

4. The method of claim 3, wherein said hydrophilic polymer is polyvinyl alcohol.

5. The method of claim 3, wherein said solvent is a hydrophilic solvent.

6. The method of claim 3, wherein intersheet spacing between the graphene oxide sheets is at least 13.12 angstroms.

7. The method of claim 1, wherein said polymer is a hydrophobic polymer.

8. The method of claim 7, wherein said hydrophobic polymer is poly(methyl methacrylate).

9. The method of claim 7, wherein said solvent is a hydrophobic solvent.

10. The method of claim 7, wherein intersheet spacing between the graphene oxide sheets is at least 9.60 angstroms.

11. The method of claim 1, wherein said polymer is a copolymer containing both hydrophilic and hydrophobic units arranged randomly or in blocks.

12. The method of claim 1, wherein the amount of dissolved polymer in the mixture determines the intersheet spacing between the graphene sheets in the graphene oxide composite sheet laminate paper.

13. The method of claim 1, wherein the amount of graphene oxide in the mixture determines the intersheet spacing between the graphene oxide sheets in the graphene oxide composite sheet laminate paper.

14. The method of claim 1, wherein the graphene oxide composite sheet laminate paper comprises graphene oxide sheets of greater than about 30% by weight.

15. The method of claim 1, wherein the applying a vacuum to a bottom surface of said filtration membrane occurs for 18 hours or longer.

* * * * *